Inventors
D. B. Baker
C. R. Rogers
W. O. Bechman

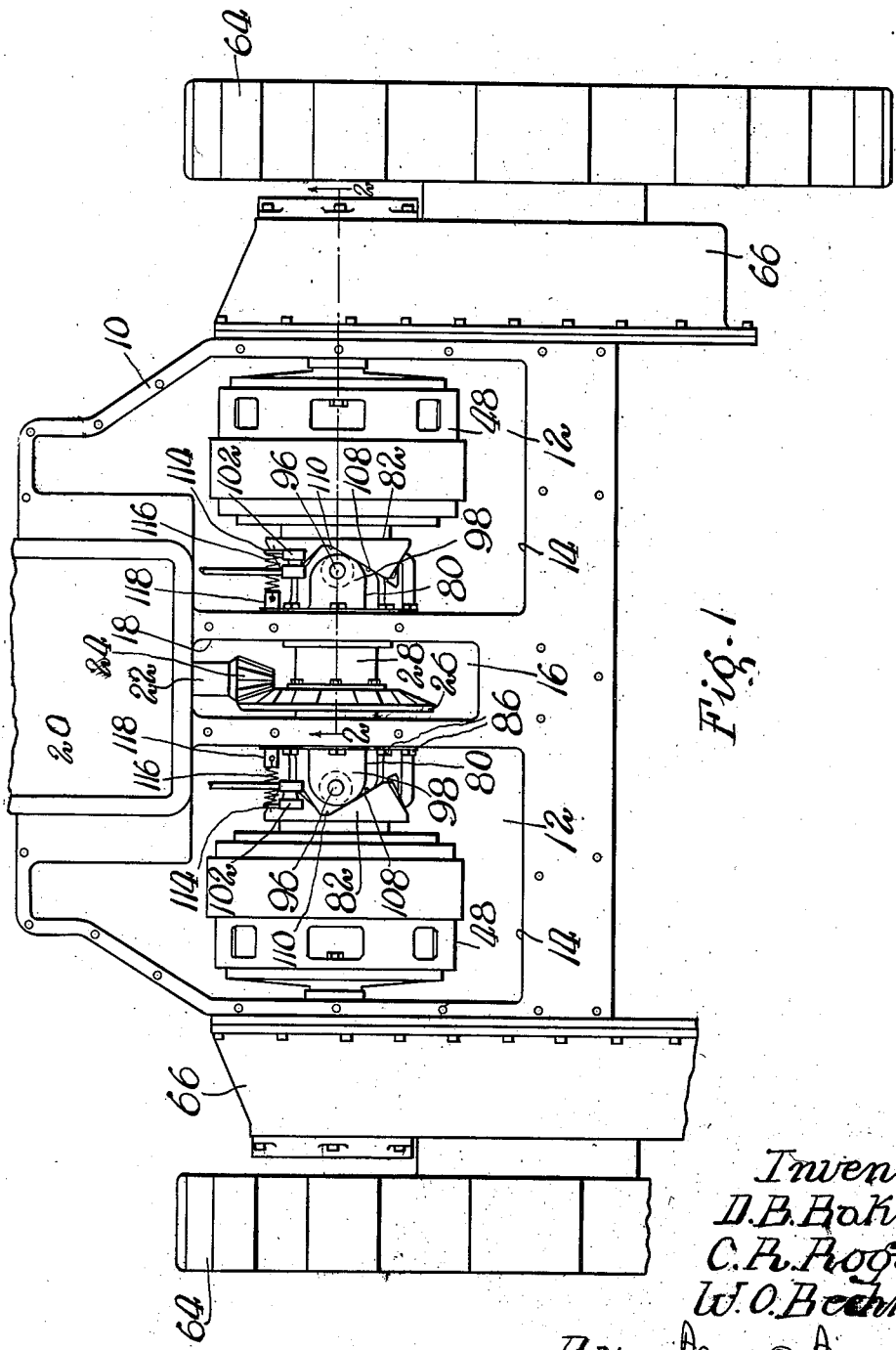

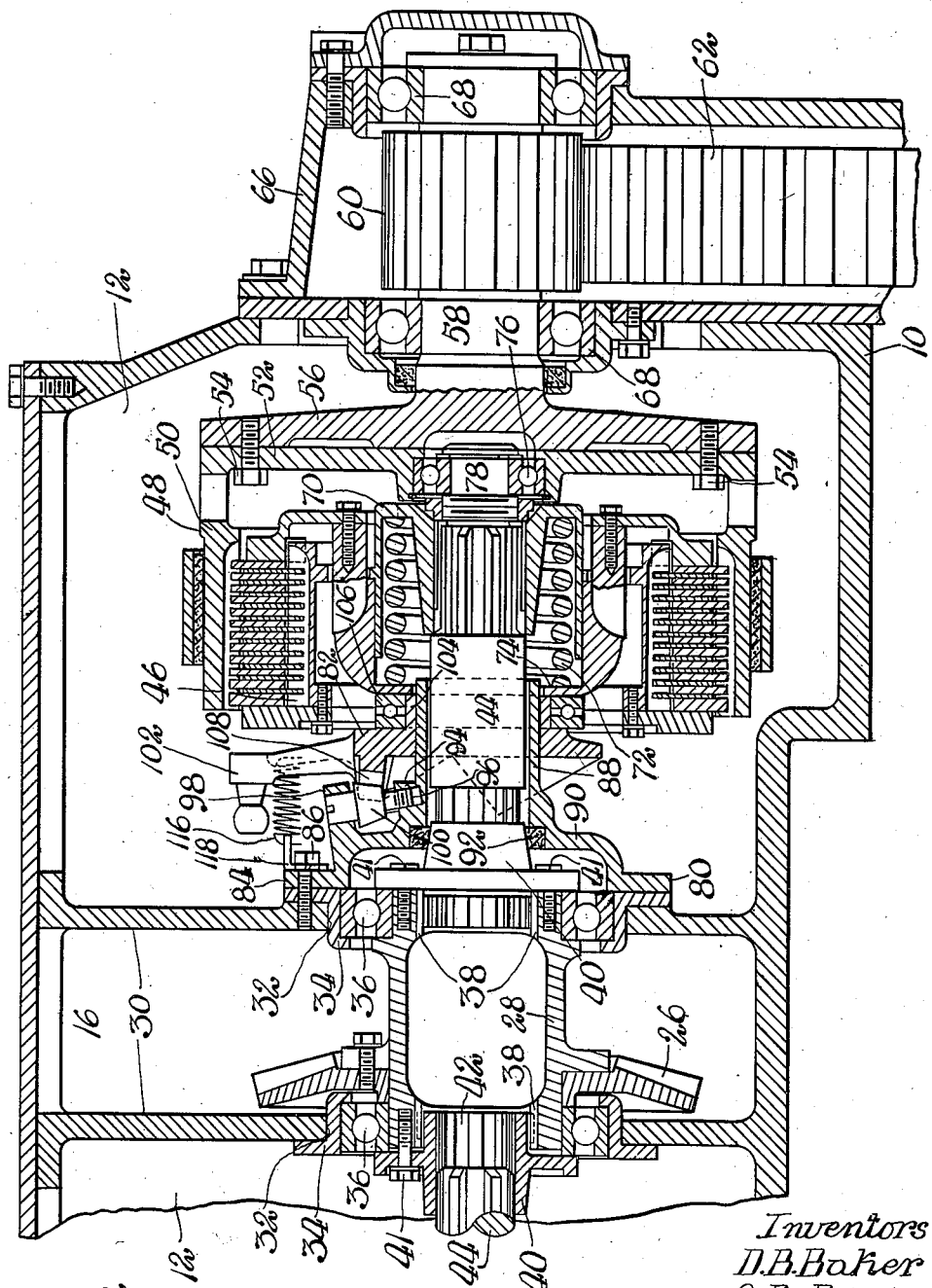

Patented Sept. 23, 1941

2,256,822

UNITED STATES PATENT OFFICE 2,256,822

TRACTOR

David B. Baker, Riverside, Clifford R. Rogers, Oak Park, and William O. Bechman, Chicago, Ill., assignors to International Harvester Company, a corporation of New Jersey Application February 15, 1939, Serial No. 256,404

10 Claims. (Cl. 180—9.2)

This invention relates to a crawler tractor and more particularly to an improved operating mechanism for the steering clutch units.

The invention contemplates the provision of actuating means for use in the final drive mechanism of the tractor, which means are capable of increased efficiency in disengaging the driving and driven parts of the respective clutch units. The means are particularly adapted to be associated respectively with a pair of steering clutch units which are located in compartments provided in the tractor body. In a particular type of construction, the steering clutch units are removable from the body and heretofore considerable difficulty has been experienced in providing suitable declutch actuating means that would permit easy and ready removal of the units without appreciably disassembling certain parts thereof, as necessitated by the actuating connections between the clutch and clutch actuating means. At the same time it is important to provide actuating means which permit increased leverage for disengaging the steering clutches. This feature is especially important in the larger type of tractors wherein ordinary actuating means are inadequate because of the increased sizes of the component parts of the driving mechanism.

The principal object of the present invention, then, is to provide improved clutch actuating means for the steering clutch units in the final drive mechanism or assembly of a crawler type tractor.

An important object is to provide such means in a manner permitting ready installation and removal thereof in conjunction with the mounting of the steering clutch units.

Another object is to provide clutch actuating mechanism having cooperable cam means serving to spread the clutch parts axially for disengagement thereof.

Another object is to provide means including a rockable member for the purpose of transmitting longitudinal movement of a control means into axial movement of a clutch part for disengaging the steering clutch.

And, another object is to provide improved cam and roller means for effecting axial movement of the clutch actuating parts for spreading the same axially to disengage the clutch parts.

And, still another object is to provide clutch actuating means that may be readily installed in existing assemblies without material alterations in either.

These and other desirable objects are achieved in one preferred form of the invention in which the improved clutch actuating means are installed in the rear body part of a crawler tractor in which said body part is provided with a wall carrying a shaft assembly. A pair of steering clutch units is carried by the shaft assembly respectively at opposite sides of the wall and each comprises a driving and a driven part. The improved actuating means for each clutch comprises a member rigidly carried by one side of the wall and having cam means in the form of rollers thereon. The means further includes a coaxial member disposed between the first member and the clutch and mounted for movement axially and angularly with respect to the first member. A portion of the second member engages a clutch part and includes cam means cooperable with the cam means on the first member whereby angular movement of the second member spreads the members axially for disengaging the clutch parts.

A further understanding of the objects and desirable features of the invention may be had from the following detailed description taken in conjunction with the accompanying sheets of drawings, in which:

Figure 1 is a plan view of the rear portion of a crawler tractor with upper cover portions thereof removed to show generally the compartments in the body;

Figure 2 is an enlarged transverse sectional view taken substantially along the line 2—2 of Figure 1, showing the clutch and the improved actuating means in detail; and, Figures 3 and 4 are separate detail views of the members comprising the improved actuating means.

Figure 4:
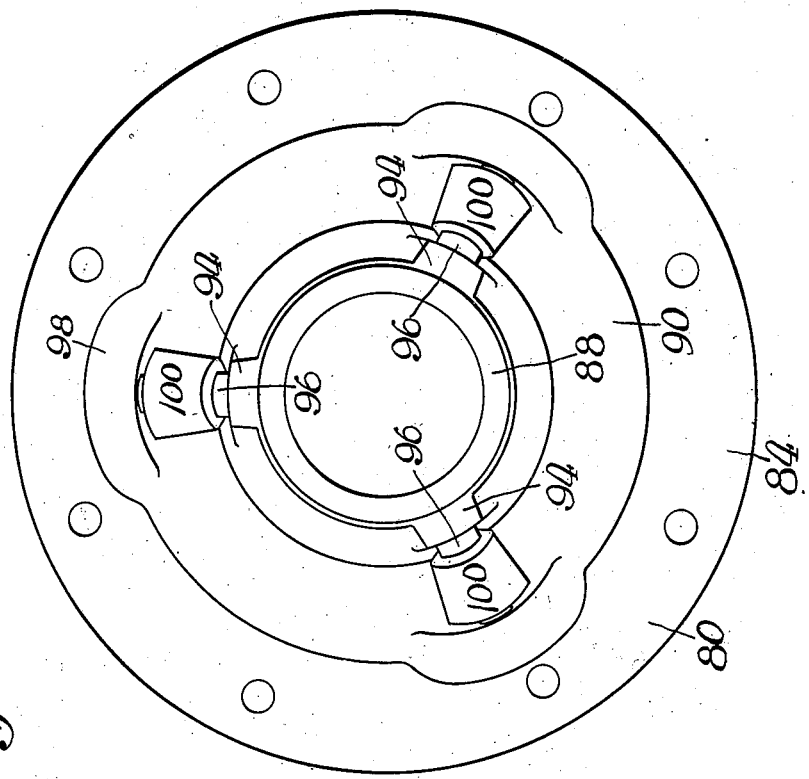

The crawler tractor chosen for purposes of illustration comprises a main frame including a rear body part 10, the forward portion of the tractor being omitted from the drawings. This rear body part is provided with a pair of transversely alined outer compartments 12 open at their tops as at 14, and a middle or intermediate compartment 16, open at its top as at 18. A housing or compartment part 20 is located just forwardly of the middle compartment 16 and contains transmission gearing, not shown, from which extends a driving shaft 22 having a pinion 24 rigidly carried thereon. The pinion 24 drives a bevel gear 26 carried on a shaft part 28 forming part of the coaxial shaft assembly included as a part of the final drive mechanism presently to be described. The compartment 16 is delineated at its sides by a pair of transversely spaced vertical walls 30 provided with transversely alined openings 32. A bearing carrying member 34 is fitted in each opening 32 and carries a ball-bearing 36, said bearings 36 journaling the shaft 28 respectively at opposite ends in the walls 30.

The shaft part 28 is preferably formed as a hollow sleeve part having its opposite ends formed with internally splined portions 38. A pair of coupling or connecting members 40 are each externally splined at one end, and one such member is fitted into a respective splined end 38 of the shaft part 28, the members then extending coaxially from opposite ends, respectively, of the part 28. The coupling member is provided with an annular flange secured by bolts 41 to the end of the shaft part 28 substantially at the respective wall 30. The purpose of this type of connection will be explained in detail in conjunction with the description of the removal of certain parts of the final drive assembly from the compartments 12.

Each coupling member 40 is internally splined as at 42 and receives the splined inner end of a second driving shaft part 44. It will be understood that both sides of the driving mechanism shaft assembly are the same and hereafter the description will pertain only to one side, having particular reference to Figure 2. The shaft 44 extends axially substantially across the compartment 12 and is splined at its outer end to the hub of a driving part 46 of a steering clutch unit 48. The steering clutch unit is of the multiple disk type and includes a related driven element 50 provided with a flat radial wall portion 52 which is secured by bolts 54 to a disk 56 comprising an integral part of a stub shaft 58. The stub shaft is disposed coaxially with respect to the shaft parts 28, 40 and 44 and comprises part of the shaft assembly of the final drive mechanism. This shaft 58 has a pinion gear 60 splined thereon, which pinion drives a bull gear 62 which in turn is connected in driving relation with a drive sprocket 64. The sprockets 64 serve to drive the track chains, not shown, in the usual manner. The body part 10 carries at each side thereof a gear housing 66 which encloses the gears 60 and 62, and which carries a pair of alined bearings 68 for supporting the stub shaft 58 at opposite sides of the pinion gear 60.

The hub of the steering clutch driving part 46, which is connected to the splined outer end of the shaft 44, is formed as a hollow drum-like part 70, which contains a comparatively strong coil spring 72. One end of the coil spring 72 abuts a radial face of the drum portion 70 and the other end abuts a radial face 74 of a portion of the driving clutch part 46 encircling the drum portion 70. The pressure of the spring 72 keeps the clutch parts 46 and 50 normally in engagement through the medium of a plurality of clutch disks, which construction and operation are more or less conventional. The radial wall portion 52 of the clutch driven part 50 is formed with a cylindrical pocket which carries a pilot bearing 76 for journaling an outer reduced end portion 78 of the driving shaft part 44. The shaft assembly is thus adequately supported throughout its tranverse extent across the rear body part through the medium of the bearings 36, 68 and 76.

The improved clutch actuating means consists of a pair of members 80 and 82, relatively axially and angularly movable and located between the wall 30 and the clutch unit 48. The member 80 is provided with an annular flange 84 which is rigidly secured by bolts 86 to the wall 30, a portion of the flange serving to retain the bearing 36. The member is further provided with a sleeve portion 88 integrally formed with the flange 84 through the medium of a radial wall portion 90 and extending from the wall 30 toward the clutch unit 48, telescopically surrounding the shaft and telescopically arranged with respect to the clutch. The radial wall portion 90 of the member is axially spaced outwardly from the wall 30 and serves substantially to enclose the circle of bolts 41 connecting the coupling member 40 to the end of the shaft part 28, said portion, of course, further enclosing the bearing 36. The wall portion 90 is provided with an internal annular recess which carries an appropriate oil seal 92 which serves to aid in preventing the escape of lubricant from the compartment 16 into the clutch or outer compartment 14.

Each sleeve is provided at its periphery with angularly spaced bosses or supporting portions 94, each of which carries one end of a spindle 96. The flange portion 84 of the member 80 is provided with a plurality of lugs or supporting portions 98 respectively in radial alinement with the supporting portions 94, each portion 98 serving to support the other end of a respective spindle 96. The arrangement and relation between the supporting portions 94 and 98 provide for the disposition of the spindles with their axes respectively on radii of the flange, or in other words or radii extending through the axis of the shaft assembly. The axis of each spindle 96 is further inclined at a slight degree toward the flange 84 and each spindle carried a tapered roller 100. The provision of the inclined axes and the tapered rollers provides desirable clearance for a preferred form of the member 82 which will be presently described.

Figure 3:
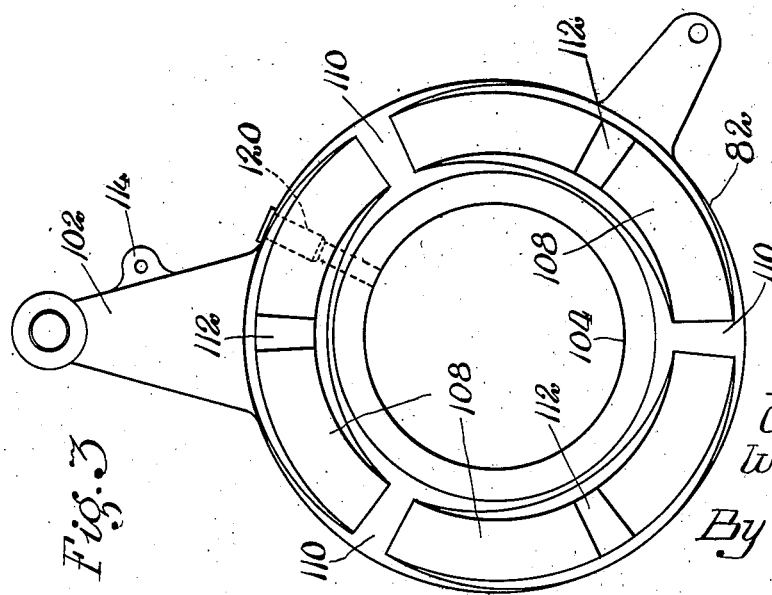

The member 82, as best shown in Figure 3, is substantially circular and is provided with a radially extending arm 102 to which control linkage, not shown, may be connected. The member 82 is journaled or angularly movably carried on the sleeve 88 of the member 80 and at its face toward the clutch 48 is provided with a collar or sleeve portion 104 on which is carried a throw-out bearing 106. The throw-out bearing is abutted at one side by an annular radial face of the member 82 and at its other side by the radial wall portion 74 of the clutch driving part 46. The member 82 is thus associated with the clutch driven part through the medium of the throw-out bearing 106 which encircles the shaft 44, the sleeve 88 and the collar 104. The member 82 is provided at its inner face with cam means cooperable with the cam means provided by the rollers 100 on the member 80. The cam means on the member 82 is in the form of a plurality of arcuate portions 108. Each arcuate portion begins at a low point 110, substantially on the inner radial face of the member 82, and extends angularly and substantially axially toward a high point 112 and thence angularly and axially toward a low point disposed substantially in the plane of the preceding low point. The cam means on the member 82 consists of three arcuate portions or faces 108 having three low points 110 and three high points 112, all of which correspond to the three rollers 100 on the member 80. As previously mentioned, the arm 102 provided on the member 82 is connected to control linkage, not shown, for rocking the member about the sleeve 88 of the member 80. This rocking or angular movement of the member 82 with respect to the member 80 engages the respective cam means of the members, thus causing the members to be spread axially, which results in axial movement of the throw-out bearing 106, which in turn compresses the spring 72 and disengages the clutch parts 46 and 50.

The arm 102 of the member 82 is provided with an ear or lug 114 to which one end of a coil spring 116 is attached, the other end of the spring being attached to a clip 118 secured by one of the bolts 86 to the flange 84 of the member 80. When the member 82 is moved angularly with respect to the member 80, the spring 116 serves to aid in returning the member to its normal position and operates in conjunction with the force imparted by the return of the spring 72 when the clutch parts 46 and 50 are engaged. The member 82 is further provided with a radial bore 120 which serves to admit lubricant to the outer cylindrical surface of the sleeve 88.

The particular type of clutch mounting and shaft assembly illustrated in the drawings and described in connection with the improved clutch actuating means is similar to that forming the subject-matter of applicant's copending application, Serial No. 196,615, filed March 18, 1938. The improved actuating means herein disclosed is particularly adapted for use in conjunction with such a construction and has been provided in a manner enabling it to be removed together with its related steering clutch as a unit from its clutch compartment 16. Briefly, this removal of a steering clutch and a related actuating means is achieved in the following manner: After the cover, which appears generally in Figure 2, is removed, thus opening the compartments 12, whatever control linkage is utilized in conjunction with the arm 102 on the member 82 is disconnected therefrom. Next, the coil spring 116 is disconnected and the bolts 86, securing the flange 84 of the member 80 to the wall 30, are removed. The members 80 and 82 are then moved axially toward the clutch 46, it being necessary in some cases to compress the spring 72. When the member 80 is moved sufficiently axially away from the wall 30, sufficient space is presented between the wall and the flange 84 to permit access to the bolts 41 securing the flange of the coupling member 40 to the end of the shaft part 28. These bolts are then removed and the coupling member 40 may be telescoped on the shaft 44 toward the steering clutch, the parts 80 and 82 being also telescopically arranged, and the member 80 being telescopic with respect to the clutch 48 since the sleeve 88 of the member is adapted to move axially through the opening formed in the radial wall portion 74 of the clutch driven part 50. All operations at this side of the clutch are effected solely through the open top 14 of the compartment 12 and these operations are facilitated by the telescopic arrangement of the clutch operating means and the clutch parts. The operation necessary to remove the other side of the clutch from the disk 56 on the stub shaft 58 is also performed solely through the open top of the compartment, this operation consisting in the removal of the bolts 54, access to which is provided by openings formed in the clutch member 50 in the vicinity of the bolts. The clutch and related actuating means including the shaft parts 40 and 42 may thus be removed as a unit entirely through the top of the compartment 12. Assembly or installation of the aforesaid parts is accomplished merely by reversing the aforesaid procedure.

The improved actuating means has been thus provided in a manner serving best to actuate the steering clutch and to provide adequate leverage through the medium of which the clutch may be easily and efficiently operated by the tractor operator. The actuating means are adapted for use with suitable control linkage which are in turn connected to control levers mounted within easy reach of the operator, as is well known to those skilled in the art, through which levers and linkage movement of the control means and levers longitudinally of the vehicle is transmitted into axial movement of the actuating means for slipping or disengaging the clutch parts. The increased advantages present in the improved actuating means have been attained without complicating the final drive organization, and ready removal of the clutch units and other servicing operations have not been materially interfered with.

Numerous advantages and features present in the preferred form of the invention illustrated may be similarly obtained in other forms, and it will be understood that various modifications and alterations may be made in this preferred form without departing from the spirit and scope of the invention as defined in the appended claims.

What is claimed is:

1. In a crawler tractor having a rear body part provided with a compartment formed by spaced inner and outer walls, a driving shaft carried in the inner wall and extending toward the outer wall, a steering clutch located in the compartment and having driving and driven parts, the former being carried on the shaft, the combination with the clutch of clutch throw-out mechanism therefor, said mechanism comprising a member rigidly carried by the inner wall and including a sleeve surrounding the shaft, a roller carried by the member at its outer face, a throw-out bearing encircling the sleeve and abutting a clutch element, and an angularly movable member carried on the sleeve and associated with the bearing, said movable member being formed with an inner cam face engageable with the roller on the first member upon angular movement to spread the members axially to disengage said clutch elements.

2. In a crawler tractor having a rear body part including a pair of outer, open-top compartments and a middle compartment, said middle compartment being separated from the outer compartments by a pair of transversely spaced walls, a shaft part journaled in said walls within the middle compartment, a pair of steering clutch units located respectively in the outer compartments, and a pair of drive shafts associated respectively at their outer ends with the steering clutches and removably and telescopically connected at their inner ends respectively to the first shaft part, the combination with the clutch of a pair of telescopic, relatively angularly movable members located wholly within each outer compartment and telescopically surrounding the respective drive shafts, one of said members of each pair being removably carried by the separating wall of a respective outer compartment and the other member being operatively associated with a respective clutch unit, said members including cooperable cam portions for spreading the members axially upon relative angular movement thereof for disengaging the respective clutch unit parts, said members being telescopic along the respective drive shaft for removal from the compartment of the respective clutch unit and its associated drive shaft and members through the aforesaid open top of the compartment.

3. In a crawler tractor having a body part formed with a compartment with a wall at one side, a shaft carried in the wall and extending into the compartment, and a steering clutch unit in the compartment including driving and driven parts, the former being connected to the shaft, the combination with the clutch of a sleeve surrounding the shaft in the compartment and secured to the wall, a roller carried on an axis substantially an extended radius of the sleeve, a member carried on the sleeve for angular movement thereabout and having a cam face engageable with the roller, a throw-out bearing journaled on the member and abutting the clutch driven part, angular movement of the member engaging the cam face thereon with the roller to shift said member axially with respect to the sleeve for disengaging the clutch parts.

4. In a crawler tractor having a body part provided with a compartment including a wall, a shaft carried by the wall, and a steering clutch in the compartment having driving and driven parts, the former being connected to the shaft, the combination with the clutch of clutch throw-out means for the clutch comprising a flanged sleeve secured rigidly to the wall with the sleeve extending coaxially about the shaft toward the clutch, a plurality of integral, angularly spaced lugs formed on the flange and extending in the direction of the sleeve, a plurality of rollers journaled respectively on axes passing through the sleeve and the lugs on the flange, and an angularly movable member carried on the sleeve and formed with a plurality of cam portions respectively cooperable with the aforesaid rollers, a portion of said member engaging the clutch driven part, whereby angular movement of the member moves the member axially and disengages the clutch parts.

5. In a crawler tractor having a rear body part, a wall in said body, a shaft carried in the wall and extending at one side thereof, a second shaft removably and telescopically connected to the first shaft substantially at the wall and extending coaxially of the first shaft at the other side of the wall, and a steering clutch having driving and driven parts, the former being connected to the second shaft, the combination with the clutch of a flanged member secured to the wall and including a sleeve telescopically surrounding the second shaft, and a throw-out member telescopically and angularly movably carried on the sleeve and engaging the clutch driven part, said member having cam means cooperable with the first member to spread the members axially upon angular movement of the second member for disengaging the clutch parts.

6. In a crawler tractor having a body part, a wall included therein, a bearing in the wall, a shaft journaled in the bearing and extending at one side thereof, a second shaft removably connected to the first shaft substantially at the bearing and extending at the other side thereof, and a steering clutch unit having a driving part connected to the second shaft and a driven part, the combination with the clutch of a member including a flanged portion rigidly secured to the wall over the bearing and substantially enclosing the connection between the two shafts and a sleeve surrounding the second shaft and extending toward the clutch, a second member axially and angularly movably carried by the sleeve and associated with the clutch driven part, and cam means between the members for spreading said members axially upon angular movement of the second member to disengage the clutch parts.

7. In a crawler tractor having a body part, a wall included therein, a bearing in the wall, a shaft journaled in the bearing and extending at one side thereof, a second shaft removably connected to the first shaft substantially at the bearing and extending at the other side thereof, and a steering clutch unit having a driving part connected to the second shaft and a driven part, the combination with the clutch of a member including a flanged portion rigidly secured to the wall over the bearing and substantially enclosing the bearing and the connection between the two shafts and a sleeve surrounding the second shaft and extending toward the clutch, a second member axially and angularly movably carried by the sleeve, a throw-out bearing encircling the sleeve and engaging the clutch driven part and the second member, and cam means between the members for spreading said members axially upon angular movement of the second member to disengage the clutch parts.

8. In a crawler tractor having a body part including a wall, a shaft carried in the wall, and a clutch unit connected to the shaft at one side of the wall and comprising driving and driven parts, the combination with the clutch of a member including an annular flange rigidly secured to the clutch side of the wall about the shaft and an integral sleeve surrounding the shaft, a plurality of rollers carried on the member on axes disposed respectively on radii of the flange, said axes being further inclined toward the flange, and a second member carried by the sleeve between the clutch and flange for axial and angular movement with respect to the flange and sleeve, said second member being associated with a clutch part and including cam means engageable with the rollers on the flange.

9. In a crawler tractor having a body part including a wall, a shaft carried in the wall, and a clutch unit connected to the shaft at one side of the wall and comprising driving and driven parts, the combination with the clutch of a member including an annular flange rigidly secured to the clutch side of the wall about the shaft and an integral sleeve surrounding the shaft, a plurality of spindles, each carried at one end by the sleeve and extending radially therefrom and inclined toward the flange, a roller on each spindle, and a second member carried by the sleeve between the clutch and flange for axial and angular movement with respect to the flange and sleeve, said second member being associated with a clutch part and including cam means engageable with the rollers on the flange.

10. In a crawler tractor having a body part including a wall, a shaft carried in the wall, and a clutch unit connected to the shaft at one side of the wall and comprising driving and driven parts, the combination with the clutch of a member including an annular flange rigidly secured to the clutch side of the wall about the shaft and an integral sleeve surrounding the shaft, a plurality of spindles, each carried at one end by the sleeve and at the other end by the flange, said spindles extending radially of the sleeve in angularly spaced relation, a roller on each spindle, and a second member carried by the sleeve between the clutch and flange for axial and angular movement with respect to the flange and sleeve, said second member being associated with a clutch part and including cam means engageable with the rollers on the flange.

DAVID B. BAKER.
CLIFFORD R. ROGERS.
WILLIAM O. BECHMAN.